US008589602B2

(12) United States Patent
Bond et al.

(10) Patent No.: US 8,589,602 B2
(45) Date of Patent: Nov. 19, 2013

(54) DATA TRANSFER ENGINE WITH DELAY CIRCUITRY FOR BLOCKING TRANSFERS

(75) Inventors: Andrew Bond, Bristol (GB); Peter Cumming, Wotton-Under-Edge (GB); Coleman Hegarty, Bristol (GB); Fabienne Hegarty, legal representative, Bristol (GB)

(73) Assignee: Icera, Inc., Wilmington, DE (US)

( * ) Notice: Subject to any disclaimer, the term of this patent is extended or adjusted under 35 U.S.C. 154(b) by 0 days.

(21) Appl. No.: 13/057,679

(22) PCT Filed: May 26, 2009

(86) PCT No.: PCT/EP2009/056371
§ 371 (c)(1),
(2), (4) Date: Apr. 21, 2011

(87) PCT Pub. No.: WO2010/015434
PCT Pub. Date: Feb. 11, 2010

(65) Prior Publication Data
US 2011/0191507 A1    Aug. 4, 2011

(30) Foreign Application Priority Data

Aug. 7, 2008  (GB) .................................. 0814484.2

(51) Int. Cl.
*G06F 13/28* (2006.01)
*G06F 3/00* (2006.01)

(52) U.S. Cl.
USPC .............................................. 710/23; 710/22

(58) Field of Classification Search
USPC ............................................................ 710/23
See application file for complete search history.

(56) References Cited

U.S. PATENT DOCUMENTS

| 5,974,479 A * | 10/1999 | Satoh ............................. 710/25 |
| 7,680,963 B2 * | 3/2010 | Go et al. ......................... 710/22 |
| 8,001,430 B2 * | 8/2011 | Shasha et al. .................... 714/56 |
| 2007/0073915 A1 | 3/2007 | Go et al. |
| 2010/0312940 A1 * | 12/2010 | Shinohara ..................... 710/308 |

FOREIGN PATENT DOCUMENTS

| EP | 0327782 A1 | 8/1989 |
| JP | 2002278918 A | 9/2002 |
| WO | PCT/EP2009/056371 | 10/2009 |

* cited by examiner

*Primary Examiner* — Titus Wong

(57) ABSTRACT

A circuit comprising: an execution unit; a plurality of addressable devices; and a data transfer engine coupled to the execution unit and to the devices, operable to fetch a plurality of descriptors under control of the execution unit, and based on each of the fetched descriptors to perform a transfer of data from a respective first to a respective second of the devices. The DMA engine comprises delay circuitry operable to block, during a delay period running from an earlier of the transfers, any later of the transfers involving at least one of the same devices as the earlier transfer, the delay circuitry being arranged to control the blocking in dependence on an indication received in one of the descriptors.

21 Claims, 5 Drawing Sheets

DATA TRANSFER ENGINE WITH DELAY CIRCUITRY FOR BLOCKING TRANSFERS

FIELD OF THE INVENTION

The present invention relates to controlling delays in direct memory access (DMA) transfers.

BACKGROUND

A direct memory access (DMA) engine moves a block of data from a source device to a destination device autonomously from CPU control. The individual DMA transfer is configured using a descriptor normally containing the source address, destination address, a number of control parameters and a link to the next transfer for the DMA engine to process once complete. Usually a DMA engine will be constructed of a number of independent contexts processing transfers in parallel, each context having dedicated hardware. The descriptor can be fetched from any memory the DMA engine has access to. This can be local dedicated memory or external off-chip memory.

To facilitate the transfer of data to or from a target device (either the source or destination device respectively), DMA engines have a throttle mechanism to automatically stall the transfer until the target is ready to send or receive data. This is usually implemented using a "sync" wire between the target and the DMA engine to indicate the ready status of a first-in-first-out (FIFO) buffer of the target.

When designing a system on chip, the timing between the target raising the sync wire to throttle the data transfer and the DMA engine taking notice is well defined.

However, timings are less tightly defined when a DMA engine transfers data off-chip, i.e. to an external device. To compensate for this, the DMA engine may be configured to wait for a certain predetermined time after a transfer before sampling the sync wire, thus delaying the point at which a subsequent transfer can be performed. This delay time is sometimes referred to as the "completion delay". There have been a number of techniques for ensuring this completion delay is long enough to cope with variable or unpredictable off-chip timings.

One way is to ensure that the completion delay is long enough so that all possible off-chip transfers are safe. This will naturally have a performance impact on transfers where the completion delay isn't the theoretical maximum, i.e. the delay will often be needlessly long.

Another way is to provide a range of different completion delays each for a different DMA context, and assign transfers to contexts accordingly. However, this reduces flexibility because the allocation of transfers to contexts is restricted.

Another way is to allow each context to have a programmable completion delay. However, all transfers on a given context will still have the same delay unless reprogrammed (which requires extra processor cycles). This therefore reduces flexibility and performance of chains of transfers to multiple targets with varying delays.

It would be desirable to provide a more flexible DMA mechanism for controlling the completion delay of off-chip transfers, without incurring as much of a performance cost or indeed any performance cost at all.

SUMMARY

According to one aspect of the present invention, there is provided a circuit comprising: an execution unit; a plurality of addressable devices; a data transfer engine coupled to the execution unit and to said devices, operable to fetch a plurality of descriptors under control of the execution unit, and based on each of the fetched descriptors to perform a transfer of data from a respective first to a respective second of said devices; wherein the DMA engine comprises delay circuitry operable to block, during a delay period running from an earlier of said transfers, any later of said transfers involving at least one of the same devices as the earlier transfer, the delay circuitry being arranged to control the blocking in dependence on an indication received in one of the descriptors.

Thus the present invention provides more flexibility in DMA transfers by enabling the completion delay to be controlled on a per-descriptor basis, so that the delay can readily be changed from one transfer to the next (including potentially within a series of linked descriptors). And at the same time, because the delay is controlled by each descriptor rather than needing to be programmed into the DMA engine by the CPU, little or no extra involvement of the CPU is required and therefore less performance cost is incurred.

According to another aspect of the present invention, there is provided a method of transferring data between a plurality of addressable devices in a circuit comprising a execution unit, the method comprising: operating a data transfer engine to fetch a plurality of descriptors under control of the execution unit; determining an indication received in one of the fetched descriptors; based on each of the fetched descriptors, performing a transfer of data from a respective first to a respective second of said devices; and in dependence on said indication in one of the descriptors, blocking during a delay period running from an earlier of said transfers any later of said transfers involving at least one of the same devices as the earlier transfer.

BRIEF DESCRIPTION OF THE DRAWINGS

For a better understanding of the present invention and to show how it may be carried into effect, reference will now be made by way of example to the accompanying drawings in which.

DETAILED DESCRIPTION OF PREFERRED EMBODIMENTS

Figure 1:
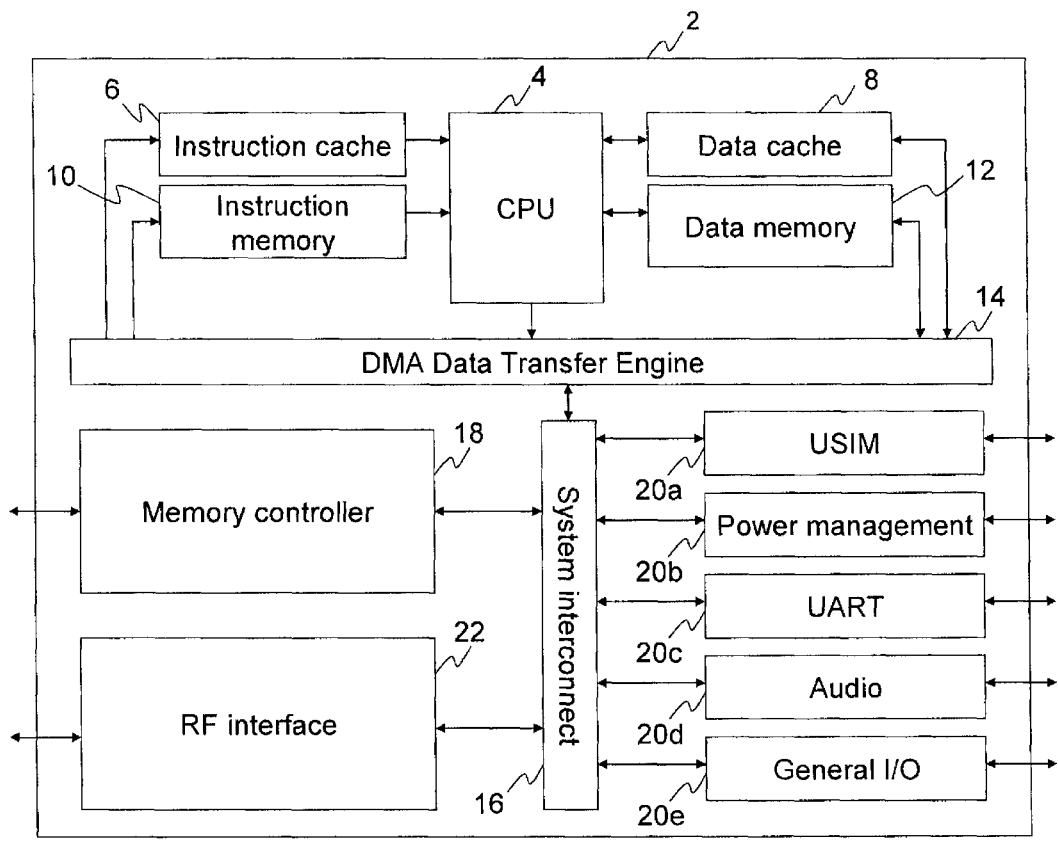
FIG. 1 is a schematic block diagram of an integrated circuit having a processor.

As an example application of the present invention, FIG. 1 schematically illustrates an integrated circuit (IC) chip 2 for use in a user equipment such as a mobile phone or other mobile terminal. The circuit 2 comprises a central processing unit (CPU) 4 to which is coupled an instruction memory 10, a data memory 12, an instruction cache 6, and a data cache 8. The circuit 2 comprises a DMA data transfer engine 14. Each of the instruction memory 10, data memory 12, instruction cache 6 and data cache 8 are coupled to the DMA engine 14, which in turn is coupled to a system interconnect 16 comprising a data bus and an address bus. The CPU 4 is also operatively coupled to the DMA engine 14 for supplying indications of DMA descriptors.

The system interconnect 16 couples between the DMA engine 14, and various on-chip devices in the form of peripheral interfaces 18, 20 and 22 which connect to external devices, i.e. external to the integrated circuit 2. These include a memory controller 18, a radio frequency (RF) interface 22 and one or more other peripheral interfaces 20. The memory controller 18 connects to one or more external memory devices (not shown). For example, the memory controller 18 may support a connection to RAM such as SDRAM or mobile DDR, to flash memory such as NAND flash or NOR flash, and/or to a secure ROM. The RF interface 22 connects with an external RF front-end and antenna (also not shown), and ultimately with a wireless cellular network over an air interface. Each of the one or more other peripheral interfaces 20 connects to a respective external peripheral (also not shown). For example, the peripheral interfaces 20 may include a USIM interface 20$a$, a power management interface 20$b$, a UART interface 20$c$, an audio interface 20$d$, and/or a general purpose I/O interface 20$e$.

In a preferred embodiment, the chip used is designed by Icera and sold under the trade name Livanto®. Such a chip has a specialised processor platform described for example in WO2006/117562.

In a preferred application of the present invention, the integrated circuit 2 is configured as a software modem, or "soft modem", for handling wireless communications with a wireless cellular network. The principle behind software modem is to perform a significant portion of the signal processing and other functions required for the wireless communications in a generic, programmable, reconfigurable processor, rather than in dedicated hardware.

Preferably, the software modem is a soft baseband modem. That is, on the receive side, all the radio functionality from receiving RF signals from the antenna up to and including mixing down to baseband is implemented in dedicated hardware. Similarly, on the transmit side, all the functionality from mixing up from baseband to outputting RF signals to the antenna is implemented in dedicated hardware. However, all functionality in the baseband domain is implemented in software stored in the instruction memory 10, data memory 12 and/or external memory, and executed by the CPU 4.

In a preferred implementation, the dedicated hardware in the receive part of the RF interface 22 may comprise a low noise amplifier (LNA), mixers for downconversion of the received RF signals to intermediate frequency (IF) and for downconversion from IF to baseband, RF and IF filter stages, and an analogue to digital conversion (ADC) stage. An ADC is provided on each of in-phase and quadrature baseband branches for each of a plurality of receive diversity branches. The dedicated hardware in the transmit part of the RF interface 22 may comprise a digital to analogue conversion (DAC) stage, mixers for upconversion of the baseband signals to IF and for upconversion from IF to RF, RF and IF filter stages, and a power amplifier (PA). Optionally, some of these stages may be implemented in an external front-end (in which case the RF interface may not necessarily input and output RF signals per se, but is still referred to as an RF interface in the sense that it is configured to communicate up/downconverted or partially processed signals with the RF front-end for the ultimate purpose of RF communications). The RF interface 22 may comprise an analogue RF interface and/or a digital radio interface such as a DigRF interface. Details of the required hardware for performing such radio functions will be known to a person skilled in the art.

Received data is passed from the RF interface 22 to the CPU 4 for signal processing, via the system interconnect 16, data transfer engine 14 and data memory 12. Data to be transmitted is passed from the CPU 4 to the RF interface 22 via the data memory 12, DMA engine 14 and system interconnect 16.

The software running on the processor 4 may then handle functions such as: modulation and demodulation, interleaving and de-interleaving, rate matching and de-matching, channel estimation, equalisation, rake processing, bit log-likelihood ratio (LLR) calculation, transmit diversity processing, receive diversity processing, Multiple-Input Multiple-Output (MIMO) processing, voice codecs, link adaptation by power control or adaptive modulation and coding, and/or cell measurements.

As mentioned, a DMA engine moves a block of data from source to destination address autonomously from CPU control. Specifically, the DMA engine allows data to be transferred directly between memory devices and/or other memory-addressable devices such as peripheral interfaces without that data needing to pass via the CPU 4. Without DMA, the CPU would have to read data from the destination device into one or more of the CPU's operand registers, and then write that data from its operand registers to the destination device. This would be wasteful of processor resources, especially where several bytes are to be transferred, because the CPU would have to be occupied throughout the entire transfer. But using DMA, software running on the CPU 4 simply sets up the DMA engine 14 to transfer the data directly by supplying it with an indication allowing the relevant descriptor or descriptors to be fetched from a suitable memory location (the descriptor normally containing the source address, destination address, a number of control parameters and a link to the next transfer for the data transfer engine 14 engine to process once complete). After the set up, the CPU 4 can then continue with other tasks whilst the DMA engine 14 completes the transfer independently of the CPU 4 based on the fetched descriptor(s).

Note that, as will be familiar to a person skilled in the art, the term "Direct Memory Access" does not limit the DMA engine to performing transfers involving memory devices. More generally, the transfer can be between any "memory mapped" or "memory addressable" device, meaning any device which is accessed by means of an address in a similar manner to a memory location. So in the example shown, the peripherals interfaces 18, 20 and 22 are incorporated into the same addressing scheme as that of the memory devices 6, 8, 10 and 12, and are accessible via the system interconnect 16 by means of memory-mapped registers in the peripheral interfaces 18, 20 and 22. So for example, the DMA engine 14 could be used to transfer data directly between two peripheral interfaces 20, between two peripheral interfaces 18, 20 and/or 22, or between a peripheral interface 18, 20 or 22 and a memory device 6, 8, 10 or 12.

In a preferred embodiment, the DMA Engine 14 has a single programmable completion delay, but each individual transfer descriptor can be programmed to either adhere to the programmed delay or not. This allows more flexibility, as linked descriptor chains can access on-chip (low latency completion delay) and off-chip (high latency programmable completion delay) peripherals safely without sacrificing performance.

Previous DMA engines had programmable completion delays to allow transfers to off-chip peripherals, but this had to be set as a setting of the DMA engine itself and not for an individual transfer. In contrast, the described DMA engine 14 allows delays to be controlled on a per descriptor basis. This provides more flexibility in programming DMA transfers in a system consisting of targets with mixed response latencies, by enabling a programmable completion delay in the transfer description rather than in the DMA engine. Thus it allows access to high response latency targets without a negative effect on low latency targets. Further, it is more flexible with a programming model where the completion delay can be adapted within a single descriptor chain.

Figure 2:
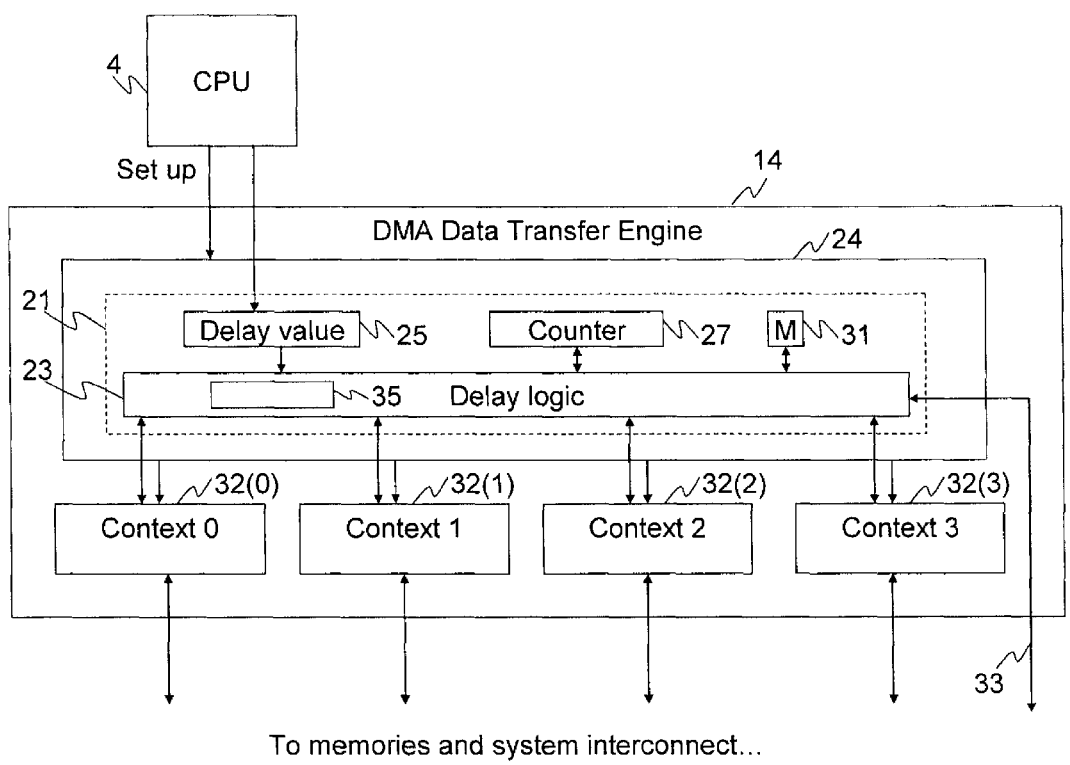
FIG. 2 is a schematic block diagram of a DMA engine.

An example DMA engine 14 according to a preferred embodiment of the present invention is now discussed in more detail with reference to the schematic block diagram of FIG. 2.

The DMA engine 14 comprises a control block 24 and a plurality of parallel DMA contexts 32(0) ... 32(3). There may be any number of contexts, perhaps in the region of forty, but by way of example only four are shown here. The control block 24 is coupled to the CPU 4 and to each of the contexts 32. Each context 32 has available fetch circuitry for fetching DMA descriptors specified by software executed on the CPU 4 in the setup, and transfer circuitry for performing the DMA transfer described by descriptor fetched by that context's fetch circuitry. Each of the fetch and transfer circuitry of each context is coupled to the system interconnect 16 and memory devices 6, 8, 10 and 12. It should be noted that separate hardware to perform descriptor fetch and data transfer is not necessarily provided for every context, especially if there is a large number of contexts such as forty. In embodiments, contexts can share the hardware for performing descriptor fetches and/or the hardware for performing data transfers based on fetched descriptor, e.g. by allocating a smaller number of fetch units and/or transfer units to the contexts as and when they are needed.

The control block 24 comprises delay circuitry 21, which comprises a delay register 25, a counter 27, delay logic 23 including delay control logic 35, and a respective one-bit mask register 31 for each device to or from which the DMA engine can transfer data (only one is shown for simplicity). The delay logic is coupled to the delay register 25, counter 27 and mask register 31. The delay logic 23 is also coupled to each of the DMA contexts 32(0) ... 32(3). Further, the delay logic 23 is coupled to each of the peripheral interfaces 18, 20 and 22 by a respective synchronisation ("sync") wire 33 (again only one is shown for simplicity). The delay register 25 is coupled to the CPU 4 so as to be accessible to software.

In operation, code executed on the CPU 4 sets up a DMA transfer by supplying an indication of a descriptor from the CPU 4 to the control block 24 of the DMA engine 14. The indication preferably comprises a memory address from which the descriptor is to be fetched. The control block allocates one of the contexts 32(0) ... 32(3) for handling the transfer, and the allocated context 32 fetches the descriptor from the indicated memory address. As mentioned, the descriptor contains the address of a source device and address of a destination device for the transfer (as well as one or more control parameters). Thus the source and destination for the DMA transfer are identified in the fetched descriptor.

Note, a descriptor of one transfer may also link to another descriptor corresponding to the next transfer for the DMA engine to process once that transfer is complete. Thus it is possible to create a series of linked descriptors, so that a whole chain of two or more transfers may be set up by the CPU 4 supplying an indication of only one descriptor, i.e. the first descriptor in the series.

Figure 3:
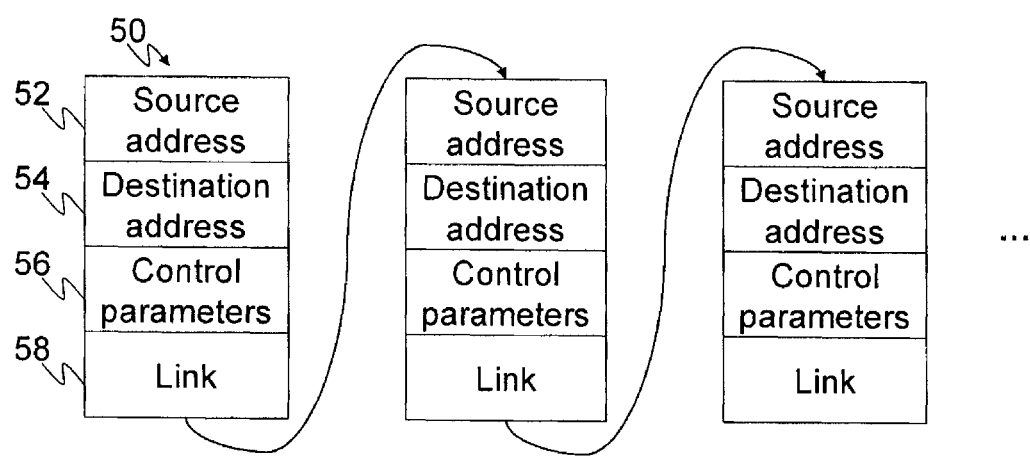
FIG. 3 is a schematic representation of a series of linked descriptors.

A series of linked descriptors is illustrated schematically in FIG. 3, which shows a plurality of descriptors 50 each comprising a respective source address 52, destination address 54, one or more control parameters 56, and a link 58 to the next descriptor. The allocated context 32 fetches and processes each descriptor 50 in turn, with the CPU 4 only needing to indicate the first descriptor to set up the corresponding chain of transfers.

Linked descriptors can be used for example to perform transfers of large amounts of data that could not otherwise be set up using a single descriptor, or discontinuous transfers where the source and/or destination addresses are not continuous, or circular transfers where data is to be transferred repeatedly to or from a certain address or addresses.

However, the invention is not limited to linked descriptors, and can be useful even when the CPU 4 sets up transfers by indicating individual descriptors.

Figure 4:
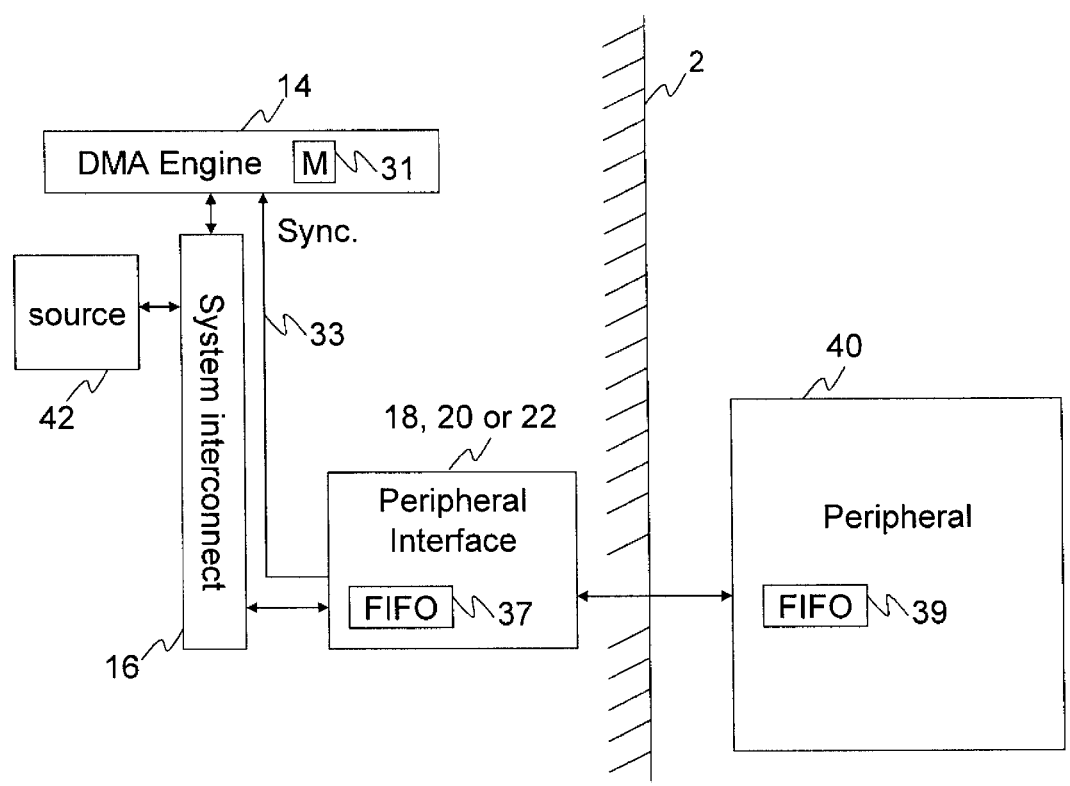
FIG. 4 is a part of the circuit of FIG. 1.

To ensure the correct timing, the performance of the transfer is dependent on the delay logic 23. The DMA engine 14 is configured such that after the descriptor has been fetched by a context's fetch circuitry, the transfer circuitry of a context 32 will not complete the transfer to until allowed to do so by the delay logic 23. The delay logic 23 operates in conjunction with the rest of the delay circuitry 21 as follows. Reference is made to the simplified block diagram of FIG. 4, in which only one peripheral interface device 18, 20 or 22 and its FIFO buffer 37 is shown, connected to a peripheral 40, along with only one mask register 31 and one sync wire 33. It will be understood that a similar mechanism is provided on the chip 2 for the other devices to or from which the DMA engine 14 can perform transfers. A source device 42 is also shown.

Consider a transfer of data to a destination device (in general any destination device, not necessarily a peripheral interface 18, 20 or 22). When a device's FIFO 37 has space available and is therefore ready to accept data, it asserts a signal on the sync wire 33 (the assertion of the signal on the sync wire 33 may be thought of as a request by that destination device for data). If at the same time the DMA engine 14 has data ready to transfer to that device, then this triggers the context's transfer circuitry to complete the transfer. When the device's FIFO 37 receives the data, returns a write response signal to acknowledge that data has been written to the destination device's FIFO 37 (this could for example be signalled via the system interconnect 16 or by another dedicated link between the destination interface and DMA engine, not shown). If the data fills the FIFO 37, it de-asserts the signal on the sync wire 33 (the de-assertion of the signal on the sync wire could be one way of signalling a response that data has been written to the destination device's FIFO 37).

However, there is a possibility that the DMA engine 14 will have further data ready to transfer to the same destination device while the preceding data is still "in flight" in the system interconnect 16 and has not yet arrived at the device's FIFO 37. In that case, the sync wire 33 would still be asserted and the write response would not have been generated, thus wrongly indicating that the FIFO 37 was ready to accept data. Without any further mechanism to prevent it, this would cause a race condition whereby the DMA engine 14 would attempt to transfer the further data to the FIFO 37 too early, such that it could arrive while the FIFO 37 was still occupied with the preceding data.

To avoid this, the delay circuitry 21 is provided with a mask register 31 for storing a mask bit M relating to the FIFO 37. The DMA engine 14 is configured such that further data cannot be transferred to a destination device when its mask bit M is set, but only when the mask bit is cleared. When a transfer of data to the destination begins, then the delay logic 23 sets the mask bit within the DMA engine's delay circuitry 21. The delay logic 23 is configured such that a further transfer of data cannot begin while the mask bit is set. This prevents a race condition where the request remains asserted at the end of a DMA transfer because the data is still in-flight and has not yet reached the FIFO 37 where it would cause the request to be de-asserted. The DMA writes to the destination device are posted onto the system interconnect 16 and when a write response is received then the delay logic 23 clears the mask bit, thus re-enabling further transfers to be triggered to that destination device.

However, there is an additional timing problem where the transfer is off chip, i.e. to an external peripheral 40. In this case, the addressed destination device as far as the DMA engine 14 is concerned is the interface 18, 20 or 22 to that peripheral. The problem is that the external, off-chip peripheral may be to some extent autonomous from the chip 2 and so its timing behaviour is unknown. That is, the DMA engine 14 cannot know when the external peripheral has received data or will be ready to accept the next transfer of data.

So for transfers to off-chip peripherals, an additional delay may be required since the write response is typically generated on-chip (by the peripheral interface 18, 20 or 22) before the write data has been passed on to another FIFO buffer 39 within the off-chip peripheral 40. That is, although the DMA engine 14 can tell when the FIFO 37 of the peripheral interface has received data and is ready to accept more data, it cannot tell when the actual peripheral 40 itself has received data or is ready to accept more data.

The following embodiments of the present invention allow such a delay (the completion delay) to be applied in a controllable manner on a per descriptor basis. Preferably the control is by means of a delay enable bit in each descriptor, which specifies whether or not to apply a delay value programmed into the DMA engine 14. This bit may be one of the one or more control parameters 56. As mentioned, this provides more flexibility in programming DMA transfers in a system consisting of targets with mixed response latencies, by enabling a programmable completion delay in the transfer description rather than as a setting of the DMA engine. Thus it allows access to high response latency targets without a negative effect on low latency targets. Further, it is more flexible with a programming model where the completion delay can be adapted within a single descriptor chain.

The delay circuitry 21 comprises delay control logic 35, a decremental counter 27, and a single register 25 for storing a delay in clock cycles, which is programmed by software executed on the CPU 4. A delay enable bit is provided in the DMA descriptor data structure. Once a descriptor has been fetched by a context's fetch circuitry, the delay control logic 35 reads the delay enable bit in the fetched descriptor to determine whether it is set. If (and only if) the delay enable bit is set in the descriptor, then when the last posted write response is generated by the destination interface's FIFO 37, the mask bit will not be cleared immediately. Instead, the delay control logic 35 loads the counter 27 with the programmed delay value from the delay register 25, and will only allow the delay logic 23 clear the mask bit once the counter reaches zero. The delay logic 23 will not re-sample the sync wire 33 for the next transfer until the mask bit is clear. Thus when the enable bit is set in the descriptor of a particular transfer to a given destination, then the delay control logic 35 will not allow the data of a subsequent transfer to be supplied to that destination at least until the counter 27 has counted down to zero from the delay value programmed into the delay register 25, thus adding an additional completion delay to allow for the off-chip transfer.

The programmable delay value should preferably be made sufficiently large to guarantee that the last write will have reached the FIFO 39 in the off-chip peripheral 40 and the updated peripheral request will have been latched by the DMA engine 14 before the mask bit is cleared. The descriptor bit allows this behaviour to be enabled/disabled on a per-descriptor basis ensuring that the delay is only incurred when necessary—e.g. preferably for transfers which write to off-chip peripherals, or to high-latency devices.

This delay mechanism is particularly useful in the case of a series of linked descriptors, as described in relation to FIG. 3; because in that situation, due to the quick succession of transfers potentially including successive transfers to the same destination, it is particularly likely that the DMA engine 14 would otherwise attempt to transfer data to an off-chip peripheral before that peripheral had dealt with the preceding transfer in the chain.

Figure 5:
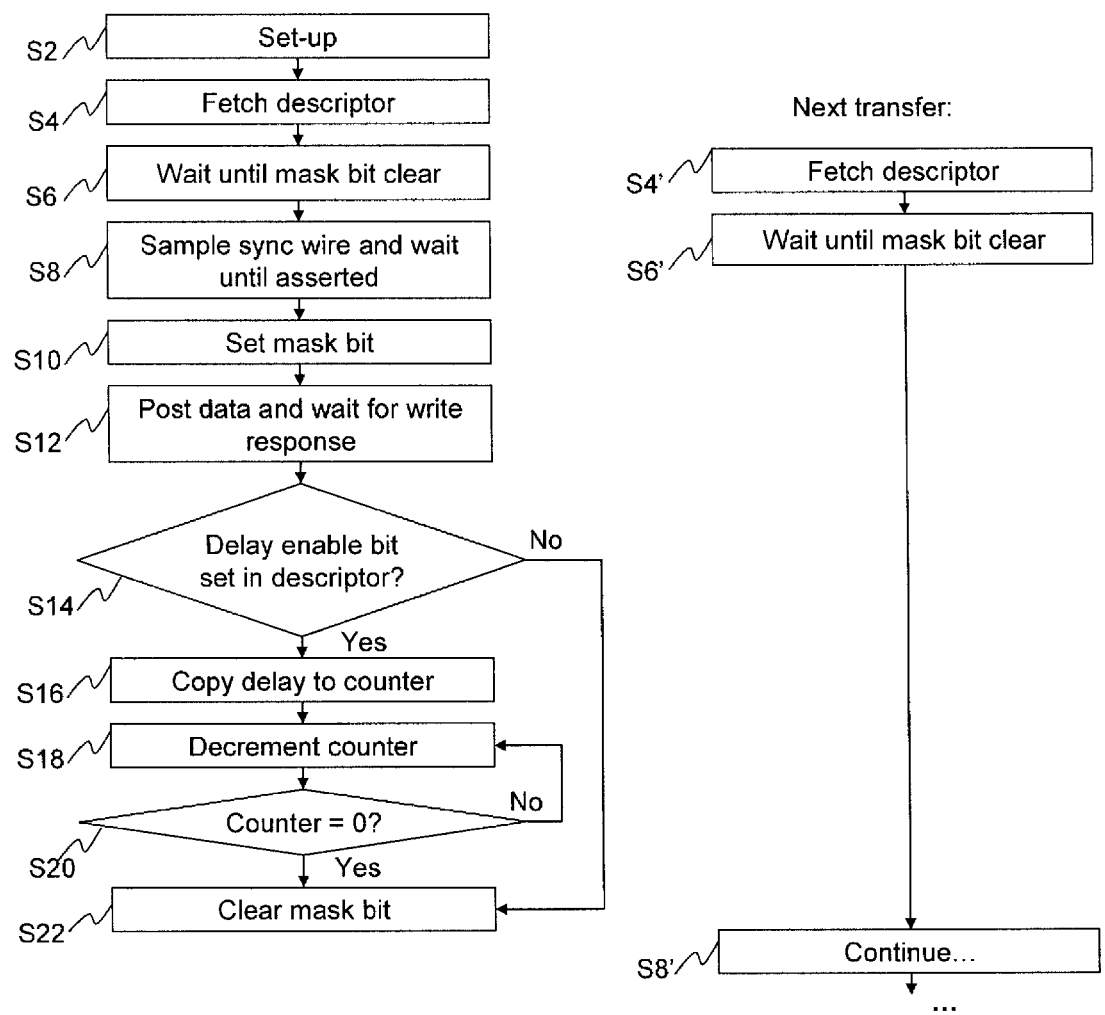
FIG. 5 is a flow chart of a DMA transfer.

The above method is now described with reference to the flow chart of FIG. 5. At step S2, the CPU 4 executes code to set up the DMA engine 14 to perform a transfer of data, by supplying an indication of a DMA descriptor to the control block 24 of the DMA engine 14. The indication is preferably the address of the descriptor. The control block 24 allocates a context 32 for handling the transfer (the allocation by the control block 24 may be autonomous or under instruction from code executed the CPU 4). Then at step S4, the fetch circuitry of that context 32 fetches the indicated descriptor from memory. The descriptor specifies the addresses of the source and destination devices of the transfer. In embodiments, the transfer circuitry of the context 32 may begin by retrieving the data from the source device 42. However, at step S6, the delay logic 23 prevents the transfer circuitry of that context 32 from completing the transfer, i.e. prevents it from supplying the data to the destination device. Instead, it must wait until the delay logic 23 detects that the mask bit M in the mask register 31 is clear, which indicates that the destination should be ready to accept data (the reason for this condition not being true may be due to a previous transfer of data to that same destination, which may not yet have been fully dealt with). At step S8, the delay logic 23 then samples the sync wire 33 and waits until it is asserted, to check that the destination's FIFO 37 has space available to accept further data.

Once these conditions are met, at step S10 the delay logic 23 begins the transfer by setting the mask bit to prevent any further transfers to the destination in question until the current transfer has been completed. Then at step S12, the transfer circuitry of the context sends the data to the destination interface's FIFO 37 by posting it onto the system interconnect 16, and waits until the write response has been received back from the peripheral interface 20 to acknowledge that the data has been written to its FIFO 37. At step S14, the delay control logic 35 of the delay circuitry 23 reads the delay enable bit of the current descriptor to determine whether an additional delay has been specified for that descriptor, e.g. because the transfer is to an off-chip peripheral 40 with a high and/or unknown latency. If not, the method skips to step S22 where the delay control logic 35 allows the delay logic 23 to clear the mask bit, allowing further transfers to the same destination to be triggered again.

On the other hand, if the delay enable bit is set, the method proceeds as follows. At step S16, the delay control logic 35 copies the delay value from the delay register 25 into the counter 27. In the next counter cycle, at step S18 the counter decrements by one and at step S18 the delay control logic 35 determines whether the counter 27 has reached zero. If not, the delay control logic 35 waits while the counter 27 continues to decrement. Once the delay control logic 35 determines that the counter 27 has reached zero, at step S22 the delay control logic 35 allows the delay logic 23 to clear the mask bit, allowing further transfers to the destination device to be triggered again. Thus the mask bit cannot be cleared and a further transfer triggered at least until the completion delay is over.

The method of a subsequent transfer to the same destination is now described with reference to steps S4', S6' and S8' in FIG. 5. At step S4', the next descriptor is fetched by the fetch circuitry of a context 32. This descriptor could have been indicated in a new set-up by the CPU 4, or could have been fetched automatically by a context 32 of the DMA engine 14 as part of a series of linked descriptors. This next descriptor can be fetched as soon as the preceding fetch at step S4 has been completed, or even before then if processed by another parallel context 32. At step S6', the delay logic 23 prevents the transfer circuitry of the context 32 from supplying the data to the destination device. Instead, it must wait until the delay logic 23 detects that the mask bit M in the mask register 31 is clear, to indicate that enough time has been left for the preceding transfer of steps S8-S22 to have been properly completed. Once the delay logic 23 does detect that these conditions are met, it allows the transfer to proceed from step S8' onwards analogously to steps S8-S22 described above.

It will be appreciated that the above embodiments are described only by way of example. In other embodiments for instance, the invention could be applied to devices other than a software modem. Further, although the above has been described as having a particular application to the transfer of data to an off-chip destination peripheral, the controllable delay of the present invention may also be useful in other situations such as delaying a transfer from a source device, or delaying a transfer to or from an on-chip source or destination device, particularly where the device has a high-latency. Further, although the above has been described as providing only a single delay enable bit in each descriptor, allowing only a choice between applying a certain delay or not, in other embodiments additional delay bits could be provided in the descriptors to allow a choice between a greater number of different delays to be applied, even approaching an effectively continuously variable delay in the case of a large delay field being provided in each descriptor. Further, although the above has been described as having only one lot of delay circuitry 21, multiple instances of the delay circuitry 21 could be included, e.g. by providing a plurality of such delay circuits for use by different DMA contexts 32. Further, although the above has been described in terms of a decremental counter 27, other possibilities such as an incremental counter could be used. Although the above has been described as using a programmable delay by means of a software accessible delay register 25, the delay need not necessarily be programmable. And although the above has been described in terms of a mechanism comprising a sync wire 33 and mask bit register 31, other mechanisms could be used. Other applications and configurations may be apparent to the person skilled in the art given the disclosure herein. The scope of the invention is not limited by the described embodiments, but only by the following claims.

The invention claimed is:

1. A circuit comprising:
an execution unit;
a plurality of addressable devices;
a data transfer engine coupled to the execution unit and to said plurality of addressable devices, operable to fetch a plurality of descriptors including an address of a respective first of said addressable devices and a respective second of said addressable devices under control of the execution unit, and based on each of the fetched descriptors to perform a transfer of data from the first addressable device to the second addressable device;
wherein the data transfer engine comprises delay circuitry operable to block, for the duration of a predetermined delay period running from an earlier of said transfers, any later of said transfers involving at least one of the plurality of addressable devices as from the earlier transfer, the delay circuitry being arranged to control the blocking in dependence on an indication received in one of the descriptors being a descriptor of the earlier transfer;
wherein the delay circuitry comprises a software-accessible register coupled to the execution unit for storing a value of the delay period, such that the delay period is programmable by software executed on the execution unit, and the indication in said one of the plurality of descriptors comprises one or more delay bits which specify whether or not to use the programmed value of the delay period in said blocking; and
wherein the delay circuitry is arranged to retrieve the programmed value of the delay period from the software-accessible register for use in said blocking if the one more delay bits specify use of the programmed value of the delay period.

2. The circuit of claim 1, wherein the delay circuitry is operable upon performing the earlier transfer to block, during the delay period, any later transfers to the second addressable device as the earlier transfer.

3. The circuit of claim 2, wherein the circuit is an integrated circuit chip, and the second addressable device is an interface to an off-chip peripheral.

4. The circuit of claim 2, wherein the data transfer engine is arranged to retrieve the data of a later transfer from the respective first addressable device, and the delay circuitry is arranged to block said later transfer by blocking supply of the respective data to the respective second addressable device until the delay period has elapsed.

5. The circuit of claim 1, wherein the data transfer engine is arranged to fetch said descriptors by fetching a series of two or more linked descriptors, each of the descriptors in the series, other than the first descriptor in the series, being fetched based on a link in a preceding descriptor in the series.

6. The circuit of claim 1, wherein the indication in said one of the descriptors comprises a delay enable bit; and said delay circuitry is arranged to control the blocking by selecting, in dependence on the delay enable bit, between a first operational state in which the blocking during said delay period is applied and a second operational state in which the blocking during said delay period is not applied.

7. The circuit of claim 1, wherein the indication in said one of the descriptors comprises a delay field of two or more delay bits; and said delay circuitry is arranged to control the blocking by selecting, in dependence on the delay field, between three or more possible values of the delay period comprising at least two non-zero values, one of the at least two non-zero values being the programmed value of the delay period.

8. The circuit of claim 3, wherein the interface is an RF interface to an RF front-end for wireless communications.

9. The circuit of claim 3, wherein the delay circuitry is arranged to receive a write response signal indicative of whether said interface has received the data of the earlier transfer, and is configured such that in addition to said delay period the later transfer is conditional on said interface indicating that it has received the data of the earlier transfer.

10. The circuit of claim 3, wherein the delay circuitry is arranged to receive a synchronisation signal indicative of whether said interface has space available to receive data, and is configured such that in addition to said delay period the later transfer is conditional on said interface indicating that it has space available.

11. A method of transferring data between a plurality of addressable devices in a circuit comprising a execution unit, the method comprising:

programming a value of the delay period into a software accessible register by executing software on the execution unit;

operating a data transfer engine to fetch a plurality of descriptors, including an address of a respective first of said addressable devices and a respective second of said addressable devices, under control of the execution unit;

based on each of the fetched descriptors, performing a transfer of data from the first addressable device to the second addressable device;

determining an indication received in one of the fetched descriptors being a descriptor of an earlier of said transfers; and in dependence on said indication in one of the descriptors, blocking for the duration of a predetermined a delay period running from the earlier transfer any later of said transfers involving at least one of the plurality of addressable devices as from the earlier transfer;

wherein the indication in said one of the descriptors comprises one or more delay bits which specify whether or not to use said programmed value of the delay period in said blocking, the method further comprising:

retrieving the programmed value of the delay period from the software-accessible register for use in said blocking if the one more delay bits specify use of the programmed value of the delay period.

12. The method of claim 11, wherein the blocking comprises, upon performing the earlier transfer, during the delay period blocking any later transfers to the second addressable device as the earlier transfer.

13. The method of claim 12, wherein the data transfer engine, the execution unit and said first addressable device are part of an integrated circuit chip, and the second addressable device is an interface to an off-chip peripheral.

14. The method of claim 12, comprising operating the data transfer engine to retrieve the data of a later transfer from the respective first addressable device, and said blocking comprises blocking said later transfer by blocking supply of the respective data to the respective second addressable device until the delay period has elapsed.

15. The method of claim 11, comprising operating the data transfer engine to fetch said descriptors by fetching a series of two or more linked descriptors, each of the descriptors in the series, other than the first descriptor in the series, being fetched based on a link in a preceding descriptor in the series.

16. The method of claim 11, wherein the indication in said one of the descriptors comprises a delay enable bit; and said blocking comprises selecting, in dependence on the delay enable bit, between a first operational state in which the blocking during said delay period is applied and a second operational state in which the blocking during said delay period is not applied.

17. The method of claim 11, wherein the indication in said one of the descriptors comprises a delay field of two or more delay bits; and said blocking comprises selecting, in dependence on the delay field, between three or more possible values of the delay period comprising at least two non-zero values, one of the at least two non-zero values being the programmed value of the delay period.

18. The method of claim 13, wherein the interface is an RF interface to an RF front-end for wireless communications.

19. The method of claim 13, comprising receiving a write response signal indicative of whether said interface has received the data of the earlier transfer, and in addition to said delay period making the later transfer conditional on said interface indicating that it has received the data of the earlier transfer.

20. The method of claim 13, comprising receiving a synchronization signal indicative of whether said interface has space available to receive data, and in addition to said delay period making the later transfer conditional on said interface indicating that it has space available.

21. A user equipment comprising:
an execution unit;
a plurality of addressable devices;
a data transfer engine coupled to the execution unit and to said plurality of addressable devices, operable to fetch a plurality of descriptors including an address of a respective first of said addressable devices and a respective second of said addressable devices under control of the execution unit, and based on each of the fetched descriptors to perform a transfer of data from the first addressable device to the second addressable device;
wherein the DMA data transfer engine comprises delay circuitry operable to block, for the duration of a predetermined a delay period running from an earlier of said transfers, any later of said transfers involving at least one of the plurality of addressable devices as from the earlier transfer, the delay circuitry being arranged to control the blocking in dependence on an indication received in one of the descriptors being a descriptor of the earlier transfer;
wherein the delay circuitry comprises a software-accessible register coupled to the execution unit for storing a value of the delay period, such that the delay period is programmable by software executed on the execution unit, and the indication in said one of the descriptors comprises one or more delay bits which specify whether or not to use the programmed value of the delay period in said blocking; and
wherein the delay circuitry is arranged to retrieve the programmed value of the delay period from the software-accessible register for use in said blocking if the one more delay bits specify use of the programmed value of the delay period.

* * * * *